United States Patent
Fan et al.

(10) Patent No.: US 9,924,537 B2
(45) Date of Patent: Mar. 20, 2018

(54) CONTROL INFORMATION INDICATION METHOD AND APPARATUS

(71) Applicant: Huawei Technologies Co., Ltd., Shenzhen (CN)

(72) Inventors: Shuju Fan, Shanghai (CN); Zongjie Wang, Shanghai (CN); Xueli Ma, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 84 days.

(21) Appl. No.: 14/858,683

(22) Filed: Sep. 18, 2015

(65) Prior Publication Data
US 2016/0014808 A1 Jan. 14, 2016

Related U.S. Application Data

(63) Continuation of application No. PCT/CN2013/072877, filed on Mar. 19, 2013.

(51) Int. Cl.
*H04W 74/00* (2009.01)
*H04W 24/02* (2009.01)
*H04W 48/12* (2009.01)

(52) U.S. Cl.
CPC ......... *H04W 74/002* (2013.01); *H04W 24/02* (2013.01); *H04W 48/12* (2013.01)

(58) Field of Classification Search
None
See application file for complete search history.

(56) References Cited

U.S. PATENT DOCUMENTS

| | | |
|---|---|---|
| 2003/0210782 A1 | 11/2003 | Dick et al. |
| 2005/0135289 A1 | 6/2005 | Han et al. |
| 2012/0140689 A1* | 6/2012 | Pelletier ............ H04W 76/048 370/311 |
| 2012/0155316 A1* | 6/2012 | Li ..................... H04W 48/16 370/252 |
| 2014/0269566 A1 | 9/2014 | Wang et al. |

FOREIGN PATENT DOCUMENTS

| | | |
|---|---|---|
| CN | 1713778 A | 12/2005 |
| CN | 1750700 A | 3/2006 |
| CN | 101030932 A | 9/2007 |

(Continued)

OTHER PUBLICATIONS

Philips et al., "Control Channel Support for HSDPA Dual-Cell Operation", 3GPP TSG RAN WG1 Meeting #53bis, R1-082532, Jun. 30-Jul. 4, 2008, 5 pages, Warsaw, Poland.

*Primary Examiner* — Robert C. Scheibel
(74) *Attorney, Agent, or Firm* — Slater Matsil, LLP

(57) ABSTRACT

Embodiments of the present invention disclose a control information indication method and apparatus, and relate to the field of communications technologies. The method includes: sending at least one piece of control information carried in a first serving cell to a user equipment UE, where the control information includes a cell identity (CID), so that the UE parses an information field of the control information to acquire the CID, determines, according to the CID, a serving cell to which data corresponding to the control information belongs, and performs demodulation and decoding on the data in the serving cell by using the control information.

13 Claims, 7 Drawing Sheets

(56) References Cited

FOREIGN PATENT DOCUMENTS

| | | | |
|---|---|---|---|
| CN | 101035254 | A | 9/2007 |
| CN | 101400026 | A | 4/2009 |
| CN | 101651524 | A | 2/2010 |
| CN | 102625417 | A | 8/2012 |
| CN | 102684821 | A | 9/2012 |
| CN | 102932092 | A | 2/2013 |
| CN | 102938878 | A | 2/2013 |
| EP | 2302830 | A2 | 3/2011 |
| EP | 2493257 | A1 | 8/2012 |
| WO | 2009132290 | A2 | 10/2009 |
| WO | 2010062099 | A2 | 6/2010 |

* cited by examiner

CONTROL INFORMATION INDICATION METHOD AND APPARATUS

This application is a continuation of International Patent Application No. PCT/CN2013/072877 filed on Mar. 19, 2013, which is hereby incorporated by reference in the entirety.

TECHNICAL FIELD

The present invention relates to the field of communications technologies, and in particular, to a control information indication method and apparatus.

BACKGROUND

UMTS (Universal Mobile Telecommunications System) is one of global 3G standards stipulated by the International Organization for Standardization 3GPP (3rd Generation Partnership Project). In Release-5, an HSDPA (High Speed Downlink Packet Access) technology is introduced to increase a downlink data transmission rate and reduce a delay of user data transmission, so that a user has better experience in a UMTS network.

A physical layer working principle of the HSDPA technology introduced in Release-5 is as follows: a NodeB (base station) sends data to a UE (User Equipment) through an HS-PDSCH (High-Speed Physical Downlink Shared Channel) at a physical layer, and in addition, sends HS-PDSCH-related control signaling and the like through an HS-SCCH (High-Speed Shared Control Channel. After receiving the HS-SCCH, the UE performs demodulation, decoding, and the like on the HS-PDSCH by using control information carried on the HS-SCCH, and then the UE generates ACK (Acknowledgement)/NACK (Negative Acknowledgement)/DTX (Discrete Transmission) information according to a reception condition of the HS-SCCH and whether the HS-PDSCH is decoded correctly. In addition, the UE further measures a downlink channel condition and generates CQI (Channel Quality Indicator) information, the UE carries the ACK/NACK/DTX information and the CQI information on an HS-DPCCH (Dedicated Physical Control Channel (uplink) for HS-DSCH) and sends the ACK/NACK/DTX information and the CQI information to the base station, and the base station uses information fed back by the UE as a basis for service scheduling. The HS-DSCH (High-Speed Physical Downlink Shared Channel) belongs to a transmission channel at a MAC (Medium Access Control) layer in a communications protocol, and is mapped as the HS-PDSCH and the HS-SCCH at the physical layer.

Multi-carrier HSDPA technologies are successively introduced in Release-8 and later releases, and data may be concurrently sent to a UE by using multiple downlink carriers (cell). When the data is concurrently sent to the UE by using the multiple downlink carriers (cell), there is a problem of relatively low utilization efficiency of an HS-SCCH code channel resource. For example, when the HS-SCCH is sent, in an existing protocol, the HS-SCCH is independently sent on each carrier. It is assumed that there are four carriers in total, and a quantity of HS-SCCHs that are configured by a network side device for the UE and to which the UE needs to listen is 4; in this case, to support transmission over four carriers, it is required to configure one HS-SCCH on each carrier, that is, scheduling can be performed for a maximum of one UE on each carrier at a time.

SUMMARY

A control information indication method and apparatus are provided, so as to use fewer control channels in an HSDPA scenario to implement a data scheduling function the same as that of sending control information independently on each carrier, reduce a quantity of code channels of a control channel used by a network side device and a quantity of code channels of a control channel to which a UE side listens, reduce power consumption, and improve utilization efficiency of code channel resources.

According to a first aspect, a control information indication method is provided, including: sending at least one piece of control information carried in a first serving cell to a user equipment UE, where the control information includes a cell identity CID, so that the UE parses an information field of the control information to acquire the CID, determines, according to the CID, a serving cell to which data corresponding to the control information belongs, and performs demodulation and decoding on the data in the serving cell by using the control information.

In a first possible implementation manner, the at least one piece of control information is the at least one piece of control information carried on a high speed shared control channel HS-SCCH of the first serving cell.

The information field of the control information includes a first part Part1 and a second part Part2, and the cell identity is set in the first part Part1 in the information field of the control information and/or the second part Part2 in the information field of the control information.

Further, before the sending at least one piece of control information carried in a first serving cell to a user equipment UE, the method further includes: setting for the UE an HS-SCCH code channel set to which the UE needs to listen.

With reference to the first aspect or the first possible implementation manner of the first aspect, in a second possible implementation manner, the sending at least one piece of control information carried in a first serving cell to a user equipment UE includes: sending each piece of control information to the UE by using one code channel in the code channel set.

With reference to the first aspect, the first possible implementation manner of the first aspect, or the second possible implementation manner of the first aspect, in a third possible implementation manner, the serving cell to which the data corresponding to the control information belongs is the first serving cell or a second serving cell.

According to a second aspect, a control information indication method is provided, including: receiving at least one piece of control information sent by a base station in a first serving cell; parsing an information field of the control information to acquire a cell identity CID; determining, according to the cell identity, a serving cell to which data corresponding to the control information belongs; and performing demodulation and decoding on the data in the serving cell by using the control information.

In a first possible implementation manner, the information field of the control information includes a first part Part1 and a second part Part2, and the cell identity is set in the first part Part1 in the information field of the control information and/or the second part Part2 in the information field of the control information.

With reference to the second aspect or the first possible implementation manner of the second aspect, in a second possible implementation manner, the serving cell to which the data corresponding to the control information belongs is the first serving cell or a second serving cell.

According to a third aspect, a base station is provided, including: a sending unit, configured to send at least one piece of control information carried in a first serving cell to a user equipment UE, where the control information includes a cell identity CID, so that the UE parses an information field of the control information to acquire the CID, determines, according to the CID, a serving cell to which data corresponding to the control information belongs, and performs demodulation and decoding on the data in the serving cell by using the control information.

In a first possible implementation manner, the at least one piece of control information is the at least one piece of control information carried on a high speed shared control channel HS-SCCH of the first serving cell.

The information field of the control information includes a first part Part1 and a second part Part2, and the cell identity is set in the first part Part1 in the information field of the control information and/or the second part Part2 in the information field of the control information.

Further, before the sending unit sends the at least one piece of control information carried in the first serving cell to the user equipment UE, the base station further includes: a setting unit, configured to set for the UE an HS-SCCH code channel set to which the UE needs to listen.

With reference to the third aspect or the first possible implementation manner of the third aspect, in a second possible implementation manner, the sending unit is further configured to: send each piece of control information to the UE by using one code channel in the code channel set.

With reference to the third aspect, the first possible implementation manner of the third aspect or the second possible implementation manner of the third aspect, in a third possible implementation manner, the serving cell to which the data corresponding to the control information belongs is the first serving cell or a second serving cell.

According to a fourth aspect, a user equipment is provided, including: a receiving unit, configured to receive at least one piece of control information sent by a base station in a first serving cell; a parsing unit, configured to parse an information field of the control information received by the receiving unit, to acquire a cell identity CID; a determining unit, configured to determine, according to the cell identity obtained by the parsing unit by means of parsing, a serving cell to which data corresponding to the control information belongs; and a processing unit, configured to perform, by using the control information received by the receiving unit, demodulation and decoding on the data in the serving cell determined by the determining unit.

In a first possible implementation manner, the information field of the control information includes a first part Part1 and a second part Part2, and the cell identity is set in the first part Part1 in the information field of the control information and/or the second part Part2 in the information field of the control information.

With reference to the fourth aspect or the first possible implementation manner of the fourth aspect, in a second possible implementation manner, the serving cell to which the data corresponding to the control information belongs is the first serving cell or a second serving cell.

According to a fifth aspect, a base station is provided, including: a sender, configured to send at least one piece of control information carried in a first serving cell to a user equipment UE, where the control information includes a cell identity CID, so that the UE parses an information field of the control information to acquire the CID, determines, according to the CID, a serving cell to which data corresponding to the control information belongs, and performs demodulation and decoding on the data in the serving cell by using the control information.

In a first possible implementation manner, the at least one piece of control information is the at least one piece of control information carried on a high speed shared control channel HS-SCCH of the first serving cell.

The information field of the control information includes a first part Part1 and a second part Part2, and the cell identity is set in the first part Part1 in the information field of the control information and/or the second part Part2 in the information field of the control information.

Further, before the sender sends the at least one piece of control information carried in the first serving cell to the user equipment UE, the base station further includes: a processor, configured to set for the UE an HS-SCCH code channel set to which the UE needs to listen.

With reference to the fifth aspect or the first possible implementation manner of the fifth aspect, in a second possible implementation manner, the sender is further configured to: send each piece of control information to the UE by using one code channel in the code channel set.

With reference to the fifth aspect, the first possible implementation manner of the fifth aspect or the second possible implementation manner of the fifth aspect, in a third possible implementation manner, the serving cell to which the data corresponding to the control information belongs is the first serving cell or a second serving cell.

According to a sixth aspect, a user equipment is provided, including: a receiver, configured to receive at least one piece of control information sent by a base station in a first serving cell; and a processor, configured to parse an information field of the control information received by the receiver, to acquire a cell identity CID; configured to determine, according to the cell identity, a serving cell to which data corresponding to the control information belongs; and configured to perform demodulation and decoding on the data in the serving cell by using the control information.

In a first possible implementation manner, the information field of the control information includes a first part Part1 and a second part Part2, and the cell identity is set in the first part Part1 in the information field of the control information and/or the second part Part2 in the information field of the control information.

With reference to the sixth aspect or the first possible implementation manner of the sixth aspect, in a second possible implementation manner, the serving cell to which the data corresponding to the control information belongs is the first serving cell or a second serving cell.

Compared with the prior art, in the embodiments of the present invention, multiple pieces of control information are sent to a UE on a control channel HS-SCCH of a same serving cell, and a cell identity is set in an information field of the control information. The user equipment UE listens to the control channel of the serving cell, receives the control information, determines, according to the cell identity in the control information, a serving cell to which data corresponding to the control information belongs, and then performs demodulation and decoding on the data. Because all control information is sent after being centralized in one serving cell, it can be implemented that fewer control channels are used to achieve a scheduling function the same as that in the prior art, and a network side device may use fewer code channel numbers, and a quantity of code channels to be listened to may be reduced for the UE, thereby reducing code channel overheads for both the network side device and the UE and improving code channel utilization efficiency.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to the accompanying drawings and embodiments.

Embodiment 1

Figures 1, 2:
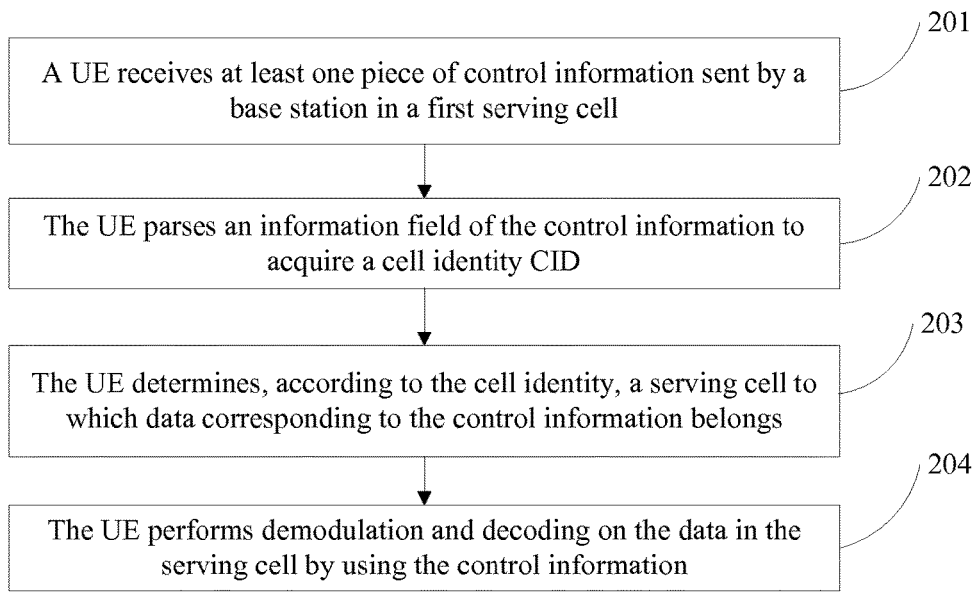
FIG. 1 is a flowchart of a method according to Embodiment 1 of the present invention.
FIG. 2 is a flowchart of a method according to Embodiment 2 of the present invention.

This embodiment provides a control information indication method. As shown in FIG. 1, the method includes: 101. A base station sends at least one piece of control information carried in a first serving cell to a user equipment UE, where the control information includes a CID (Cell Identity), so that the UE parses an information field of the control information to acquire the CID, determines, according to the CID, a serving cell to which data corresponding to the control information belongs, and performs demodulation and decoding on the data in the serving cell by using the control information.

The serving cell refers to a communications area that can be reached by a signal, that is, a physical space that can be covered by the signal, and is bound to a frequency and a scrambling code. The serving cell includes the following cases: Two base stations use different frequencies, there is one serving cell separately for signals of the two base stations in a same physical space, and the two serving cells overlay in the physical space; or two base stations use a same frequency, signals of the two base stations may have an overlapping area in a specific physical space, and in the overlapping area, the signals are differentiated by using different scrambling codes; or two base stations use signals with a same frequency and a same scrambling code, and serving cells that the signals reach are separately located in different physical spaces; or one base station uses different frequencies to send signals in a same physical space, and different serving cells can be differentiated by using the frequencies; or one base station sends signals to different physical spaces by using a same frequency or different frequencies, and different serving cells is differentiated by using the different physical spaces. Generally, the serving cells described in the present invention belong to a same base station and are differentiated by using a frequency or a physical space.

It should be noted that in WCDMA (Wideband Code Division Multiple Access), a serving cell and a carrier belong to a same conception, and the two convey a same meaning.

The cell identity may also be called a carrier identity, and the two convey a same meaning The control information is sent to the UE through the HS-SCCH channel in the first serving cell, there are multiple HS-SCCH channels in the first serving cell, and only one piece of control information can be sent through each HS-SCCH channel at a time.

Optionally, the information field of the control information includes a first part Part1 and a second part Part2, and the cell identity CID included in the control information is set in the first part Part1 in the information field of the control information and/or in the second part Part2 in the information field of the control information.

Optionally, when the UE is configured as a non-MIMO (Multiple Input Multiple Output) mode, the information field of the control information includes only two parts, that is, the first part Part1 and the second part Part2, and the cell identity CID may be set in Part1 and/or Part2.

Optionally, the cell identity CID is carried in both Part1 and Part2. In this case, the cell identity CID may be split into two parts or multiple parts, which are separately carried in Part1 and Part2, and the UE can obtain the CID only after completing parsing of the two parts, that is, Part1 and Part2. Specifically, a quantity of bits that the CID occupies in Part1 and Part2 may be set according to a system requirement, and a specific distribution situation of the CID in Part1 and Part2 is not limited herein.

Optionally, the cell identity CID may be carried in both Part1 and Part2, Part1 and Part2 separately carry a same cell identity CID independently, and the UE may obtain the CID after completing parsing of Part1.

Optionally, considering that Part1 and Part2 are separately carried in a first timeslot and next two timeslots, the cell identity CID is set in Part1, or a same CID is set in both Part1 and Part2, so that the UE can obtain the CID as early as possible.

Further, before the sending at least one piece of control information carried in a first serving cell to a user equipment UE, an HS-SCCH code channel set to which the UE needs to listen is set for the UE. For example, when the UE establishes a connection with a network side device, automatic configuration is performed for the UE by using an RNC (Radio Network Controller) or a base station (which, for example, may be a Node B), where the configuration is based on a current protocol and a UE requirement, unless a code channel set needs to be updated in a subsequent process; otherwise, the operation does not need to be performed again.

The sending at least one piece of control information carried in a first serving cell to a user equipment UE includes: sending each piece of control information to the UE by using one code channel in the code channel set.

The serving cell to which the data corresponding to the control information belongs is the first serving cell or a second serving cell. For example, in the prior art, each serving cell carries one piece of control information and data corresponding to the control information. In the embodiment, all control information is carried in the first serving cell; in addition, the first serving cell may further carry data corresponding to control information that is originally carried in the serving cell. When the UE parses the control information to obtain a CID, and determines a serving cell to which the data belongs, the serving cell to which the data belongs may be the first serving cell or the second serving cell different from the first serving cell.

Compared with the prior art, in this embodiment of the present invention, multiple pieces of control information are sent to a UE on a control channel HS-SCCH of a same serving cell, and a cell identity is set in an information field of the control information, so that the user equipment UE listens to the control channel of the serving cell, receives the control information, determines, according to the cell identity in the control information, a serving cell to which data corresponding to the control information belongs, and then performs demodulation and decoding on the data. Because all control information is sent after being centralized in one serving cell, it can be implemented that fewer control channels are used to achieve a scheduling function the same as that in the prior art, and a network side device may use fewer code channel numbers, thereby reducing code channel overheads and improving code channel utilization efficiency.

Embodiment 2

This embodiment provides a control information indication method. As shown in FIG. 2, the method includes: 201. A UE receives at least one piece of control information sent by a base station in a first serving cell.

The serving cell refers to a communications area that can be reached by a signal, that is, a physical space that can be covered by the signal, and a signal of a frequency and a scrambling code can be used within the communications area. The serving cell includes the following several special cases: Two base stations use signals with different frequencies, there is one serving cell separately for signals of the two base stations in a same physical space, and the two serving cells overlay in the physical space; two base stations use signals with a same frequency, signals of the two base stations may have an overlapping area in a specific physical space, and in the overlapping area, the signals are differentiated by using different scrambling codes; or two base stations use signals with a same frequency and a same scrambling code, and serving cells that the signals reach are separately located in different physical spaces.

It should be noted that in WCDMA, a serving cell and a carrier belong to a same conception, and the two convey a same meaning The cell identity may also be called a carrier identity, and the two convey a same meaning

202. The UE parses an information field of the control information to acquire a cell identity CID.

203. The UE determines, according to the cell identity, a serving cell to which data corresponding to the control information belongs.

204. The UE performs demodulation and decoding on the data in the serving cell by using the control information.

The information field of the control information includes a first part Part1 and a second part Part2, the cell identity CID included in the control information is set in the first part Part1 in the information field of the control information and/or in the second part Part2 in the information field of the control information.

Optionally, the cell identity CID may be set in Part1 and/or Part2.

Optionally, the cell identity CID may further be carried in both Part1 and Part2. In this case, the cell identity CID may be split into two parts or multiple parts, which are separately carried in Part1 and Part2, and the UE can obtain the CID only after completing parsing of the two parts, that is, Part1 and Part2. Specifically, a quantity of bits that the CID occupies in Part1 and Part2 may be set according to a system requirement, and a specific distribution situation of the CID in Part1 and Part2 is not limited herein.

Optionally, the cell identity CID may be carried in both Part1 and Part2, Part1 and Part2 separately carry a same cell identity CID independently, and the UE may obtain the CID after completing parsing of Part1.

Optionally, considering that Part1 and Part2 are separately carried in a first timeslot and next two timeslots, the cell identity CID is set in Part1, or a same CID is set in both Part1 and Part2, so that the UE can obtain the CID as early as possible.

The serving cell to which the data corresponding to the control information belongs is the first serving cell or a second serving cell. For example, in the prior art, each serving cell carries one piece of control information and data corresponding to the control information. In the embodiment, all control information is carried in the first serving cell; in addition, the first serving cell may further carry data corresponding to control information that is originally carried in the serving cell. When the UE parses the control information to obtain a CID, and determines a serving cell to which the data belongs, the serving cell to which the data belongs may be the first serving cell or the second serving cell different from the first serving cell.

Compared with the prior art, in this embodiment of the present invention, a user equipment UE listens to a control channel of the serving cell, receives multiple pieces of control information, where the control information is sent to the UE after being centralized on a control channel HS-SCCH of a same serving cell, determines, according to a cell identity in the control information, a serving cell to which data corresponding to the control information belongs, and then performs demodulation and decoding on the data. Because all control information is sent after being centralized in one serving cell, and the cell identity is included in a control information field, it can be implemented that fewer control channels are used to achieve a scheduling function the same as that in the prior art, and a quantity of code channels to be listened to may be reduced for the UE, thereby reducing code channel overheads and improving code channel utilization efficiency.

Embodiment 3

Figure 3:
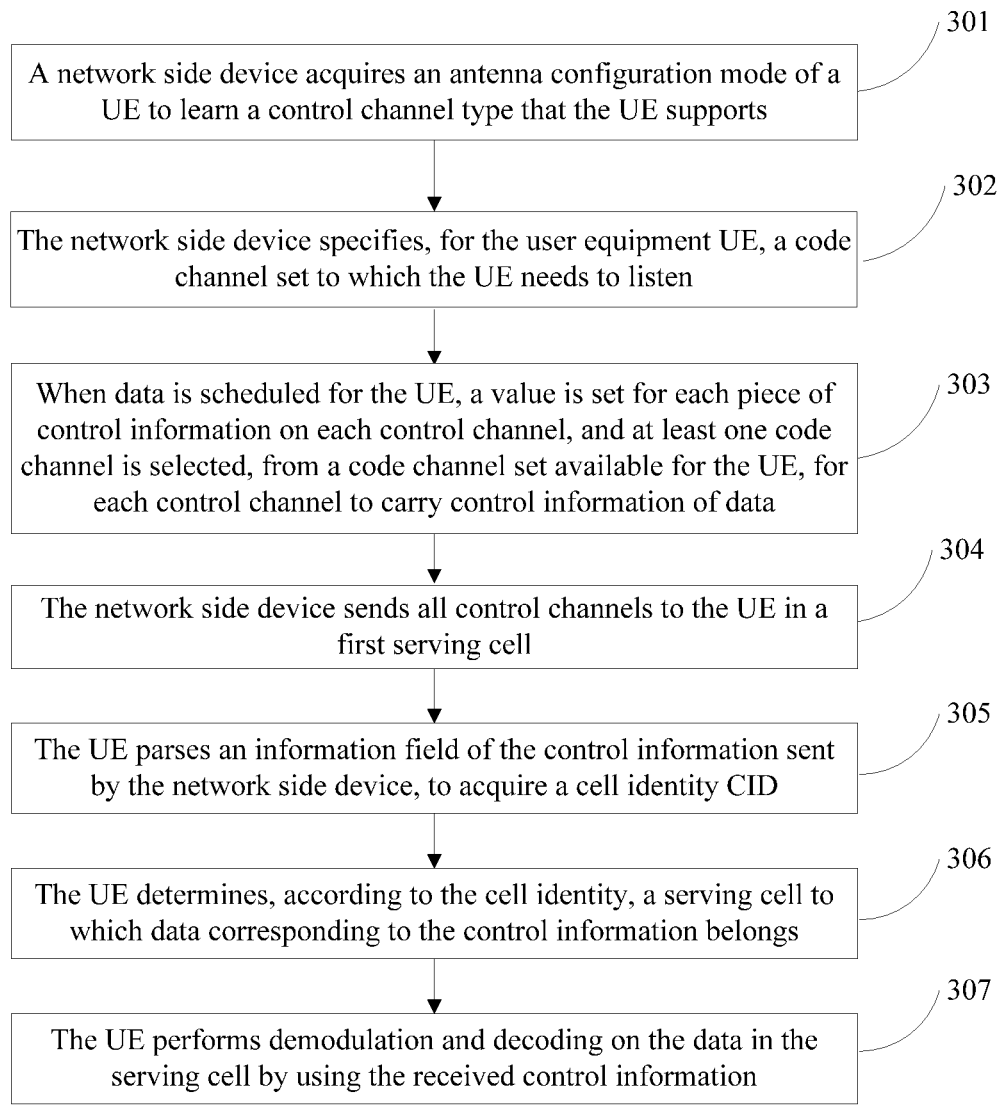
FIG. 3 is a flowchart of a method according to Embodiment 3 of the present invention.

This embodiment provides a control information indication method, where a normal carrier is first established between a network side device and a user equipment UE. As shown in FIG. 3, the method includes: 301. The network side device acquires an antenna configuration mode of the UE to learn a control channel type that the UE supports.

When the UE is configured as a non-MIMO mode, the control channel type may be called a type X (Type X). In this case, control information is distributed as shown in Table 1 (that a CID is carried in Part 1 is used as an example):

TABLE 1

| HS-SCCH Part 1 | HS-SCCH Part 2 |
|---|---|
| CCS (7 bits), | TBS (6 bits) |
| MI (1 bit), | HARQ process (4 bits) |
| NDI (1 bit) | RV (2 bits) |
| CID (K bits) | |
| UE identity (16 bits) | |

Bits represent the following meanings: CCS (Channelization-code-set information), MI (Modulation scheme information), NDI (New data indicator), TBS (Transport-block size information), HARQ process (Hybrid-ARQ process information), RV (Redundancy and constellation version), and UE identity, which indicates a UE identity and is carried in both Part1 and Part2.

The CID is a cell identity, and the K bits is related to a total quantity of supported cells, and needs to meet: $2K \geq$ Total quantity N of cells.

If the CID is carried in Part2, the control information is distributed as shown in Table 1a:

TABLE 1a

| HS-SCCH Part 1 | HS-SCCH Part 2 |
|---|---|
| CCS (7 bits), | TBS (6 bits) |
| MI (1 bit), | HARQ process (4 bits) |
| NDI (1 bit) | RV (2 bits) |
| | CID (K bits) |
| UE identity (16 bits) | |

In addition, a quantity of bits included in the TBS may be appropriately reduced and saved bits are to be used by the CID. For example, the UE supports only four cells, the TBS may be set to 4 bits and the CID is set to 2 bits. In this way, a total quantity of bits in Part2 may keep consistent with a quantity of bits of Part2 of an HS-SCCH in the prior art, and therefore an encoding method may be reused subsequently.

Optionally, considering that Part1 and Part2 are separately carried in a first timeslot and next two timeslots, the cell identity CID may be carried in Part1, so that a UE side can obtain the CID as early as possible.

When the UE is configured as a two-antenna MIMO mode, the control channel type may be called a type Y (Type Y). In this case, the control information is distributed as shown in Table 2 (that the CID carried in Part 1 is used as an example):

TABLE 2

| HS-SCCH Part 1 | HS-SCCH Part 2 | |
|---|---|---|
| | When there is only one transport block | When there are two transport blocks |
| CCS (7 bits), | TBS (6 bits) | TBS (6 bits × 2) |
| Modulation (3 bits), | HARQ process (4 bits) | HARQ process (4 bits) |

TABLE 2-continued

| HS-SCCH Part 1 | HS-SCCH Part 2 | |
|---|---|---|
| | When there is only one transport block | When there are two transport blocks |
| PCI (2 bits) | RV (2 bits) | RV (2 bits × 2) |
| CID (K bits) | | |

When the UE is configured as a four-antenna MIMO mode, the control channel type may be called a type Z (Type Z). In this case, the control information is distributed as shown in Table 3 (that the CID is carried in Part 1 is used as an example):

TABLE 3

| HS-SCCH Part 1 | HS-SCCH Part 2 | |
|---|---|---|
| | When there is only one transport block | When there are two transport blocks |
| CCS (7 bits), | TBS (6 bits) | TBS (6 bits × 2) |
| Modulation (5 bits), | HARQ process (4 bits) | HARQ process (4 bits) |
| PCI (4 bits) | RV (2 bits) | RV (2 bits × 2) |
| CID (K bits) | | |

It should be noted that X, Y and Z in the type X, type Y and type Z of the foregoing control channel are merely code names, which may be replaced with any other code names or numbers, and a specific form of X, Y and Z is not limited herein.

302. The network side device specifies, for the user equipment UE, a code channel set to which the UE needs to listen.

It should be noted that, in a process of step 302, when the UE establishes a connection with the network side device, automatic configuration is performed for the UE by using an RNC (Radio Network Controller) or a Node B (base station), where the configuration is based on a current protocol and a UE requirement, and the operation does not need to be performed again unless an HS-SCCH code channel set needs to be updated in a subsequent process.

Code channels in the code channel set may be code channels on a same carrier, or may be code channels on different carriers. The network side device may be a radio access network, for example, a UMTS (Universal Mobile Telecommunications System) Terrestrial Radio Access Network or a UTRAN (Universal Terrestrial Radio Access Network).

303. When data is scheduled for the UE, a value is set for each piece of control information on each control channel, and at least one code channel is selected, from a code channel set available to the UE, for each control channel to carry control information of data, where the value of control information includes cell identity CID information corresponding to data indicated by a control channel.

304. The network side device sends all control channels to the UE in a first serving cell.

For example, it is assumed that there are two or four carriers in total, and a quantity of HS-SCCH channels that are configured by the network side device for the UE and to which the UE needs to listen is 4.

When there are two carriers, the two carriers are marked as 1 and 2, and carrier combinations that can be supported are (1,2), (1) and (2). If only one cell is used to perform scheduling for a user, because the cell can carry four pieces of control information, the cell supports data scheduling for a maximum of four users at the same time. If two cells are used to perform scheduling for a user, one cell in the two cells carries a maximum of three pieces of control information, and therefore, each cell supports data scheduling for a maximum of three users at the same time. A total quantity of users for which scheduling can be performed by using two cells is less than or equal to 4. However, in an existing protocol, each cell can permanently perform scheduling for two users only.

When there are four carriers, the four carriers are marked as 1, 2, 3, and 4, and carrier combinations that can be supported are any subset of (1, 2, 3, 4). If only one cell is used to perform scheduling for a user, because the cell can carry four pieces of control information, the cell supports data scheduling for a maximum of four users at the same time. If two cells are used to perform scheduling for a user, one cell in the two cells carries a maximum of three pieces of control information, and therefore, each cell supports data scheduling for a maximum of three users at the same time. If three cells are used to perform scheduling for a user, one cell in the three cells carries a maximum of two pieces of control information, and therefore, each cell supports data scheduling for a maximum of two users at the same time. If four cells are used to perform scheduling for a user, each cell in the four cells carries a maximum of one piece of control information, and therefore, each cell supports data scheduling for a maximum of one user at the same time. However, in an existing protocol, each cell can permanently perform scheduling for one user only.

It may be seen from the foregoing examples that, compared with a method defined in the existing protocol, on a premise of using a same total quantity of code channels, scheduling can be performed for more users on a single carrier by using the method in this embodiment, thereby greatly improving scheduling flexibility. Therefore, to achieve a scheduling effect similar to that in the existing protocol, fewer code channel numbers are required, thereby reducing code channel overheads and improving code channel utilization efficiency.

305. The UE parses an information field of the control information sent by the network side device, to acquire a cell identity CID.

For example, it is assumed that there are four carriers in total, and the network side device is intended to support data transmission of two users on each carrier simultaneously. In the existing protocol, each serving cell serves several UEs, and if the network side device is intended to perform scheduling for N users at will at the same time, each UE needs to monitor N control channels simultaneously (because within each time unit, each control channel can be used by only one UE). Therefore, in the existing protocol, each UE on the four carriers needs to listen to eight control channels. In the method of the present invention, because there are numerous UE users on a network, and there is a relatively limited quantity of HS-SCCHs on each carrier, at least two UEs listen to a same HS-SCCH code channel; therefore, for the two UEs, if a quantity of monitored control channels is only 1, the network side device cannot perform scheduling for the two UEs at the same time. Therefore, scheduling can be simultaneously performed for the two UEs only when these UEs monitor at least one extra code channel at the same time, that is, each UE needs to listen to four control channels and one extra control channel that are on an anchor carrier, and each UE needs to listen to five control channels. Compared with the method in the existing protocol, a quantity of control channels listened to by each UE is reduced by three, thereby reducing a quantity of code channels that need to be monitored by the UE and reducing code channel overheads.

306. The UE determines, according to the cell identity, a serving cell to which data corresponding to the control information belongs.

The serving cell to which the data belongs may be the first serving cell or a second serving cell different from the first serving cell.

307. The UE performs demodulation and decoding on the data in the serving cell by using the received control information.

It should be noted that in WCDMA, a serving cell and a carrier belong to a same conception, and the two convey a same meaning Compared with the prior art, in the embodiment of the present invention, multiple pieces of control information are sent to a UE on a control channel HS-SCCH of a same serving cell, and a cell identity is set in an information field of the control information. The user equipment UE listens to the control channel of the serving cell, receives the control information, determines, according to the cell identity in the control information, a serving cell to which data corresponding to the control information belongs, and then performs demodulation and decoding on the data. Because all control information is sent after being centralized in one serving cell, it can be implemented that fewer control channels are used to achieve a scheduling function the same as that in the prior art, a network side device may use fewer code channel numbers, and a quantity of code channels to be listened to may be reduced for the UE, thereby reducing code channel overheads for both the network side device and the UE and improving code channel utilization efficiency.

Embodiment 4

Figure 4:
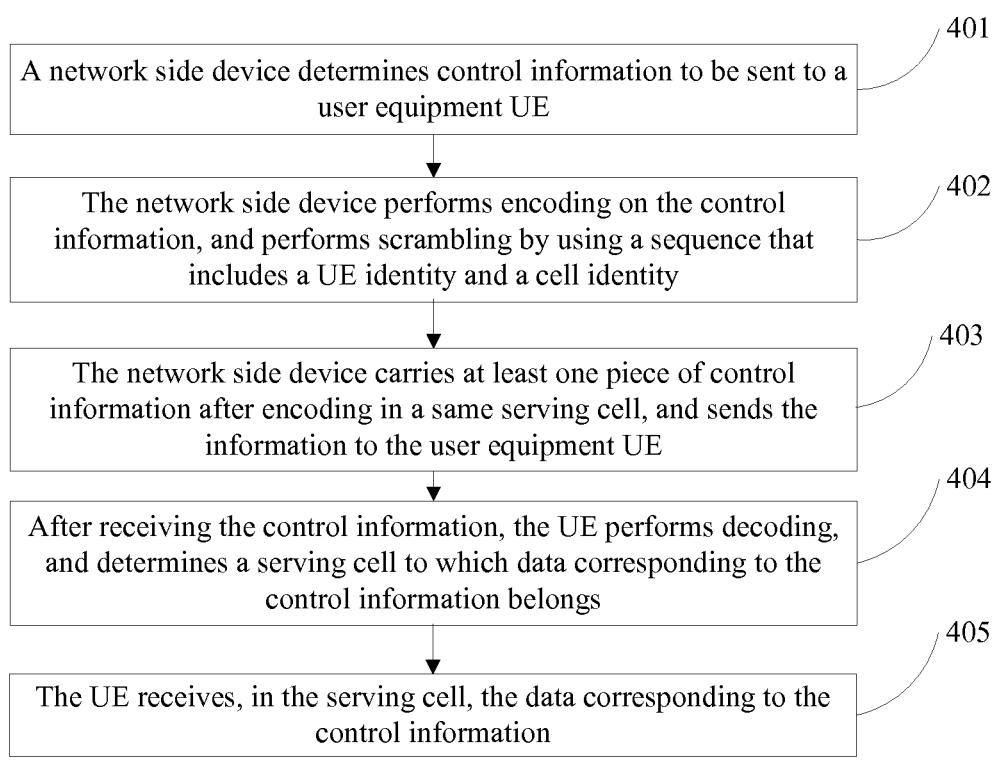
FIG. 4 is a flowchart of a method according to Embodiment 4 of the present invention.

This embodiment provides a control information indication method, where encoding is performed by using a specified UE_id, and a CID is carried in an HS-SCCH. As shown in FIG. 4, the method includes: 401. A network side device determines control information to be sent to a user equipment UE.

That the UE is configured as a non-MIMO mode is used as an example, and the control information is shown in Table 4.

TABLE 4

| HS-SCCH Part 1 | HS-SCCH Part 2 |
| --- | --- |
| CCS (7 bits), | TBS (6 bits) |
| MI (1 bit), | HARQ process (4 bits) |
| NDI (1 bit) | RV (2 bits) |
| | UE identity (UE identity, 16 bits) |

UE identity information is set according to step 402.

402. The network side device performs encoding on the control information, and performs scrambling by using a sequence that includes a UE identity (UE id) and a cell identity (Cell id).

Figure 5:
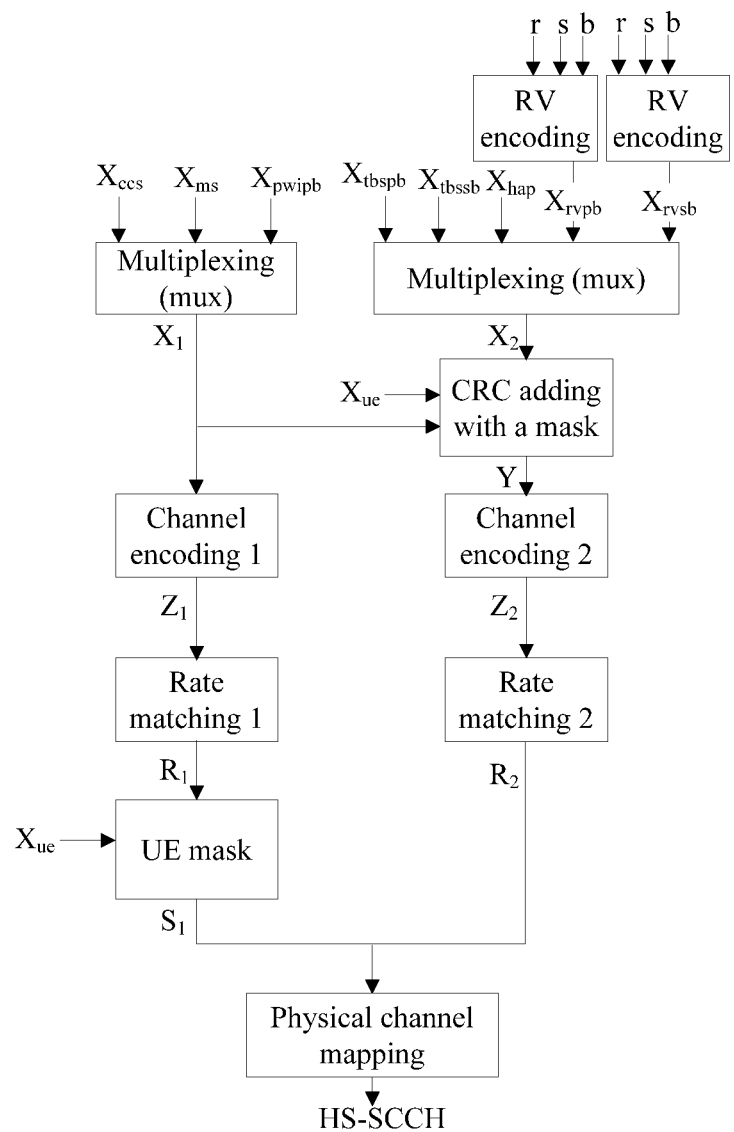
FIG. 5 and FIG. 6 are schematic flowcharts of encoding according to Embodiment 4 of the present invention.

For example, the network side device allocates the UE a group of N UE_ids, which are UE_id(1) . . . UE_id(N) respectively, where each UE_id number in the group is corresponding to one serving cell. In an encoding process, a UE_id of a cell to which data corresponding to the control information belongs is used to perform scrambling. As shown in FIG. 5, Xue represents a UE_id, and a process of scrambling by using the UE_id of the serving cell to which the data corresponding to the control information belongs, for example, UE_id(2), is a procedure executed by using Xue in the left and right parts of the figure.

Figure 6:
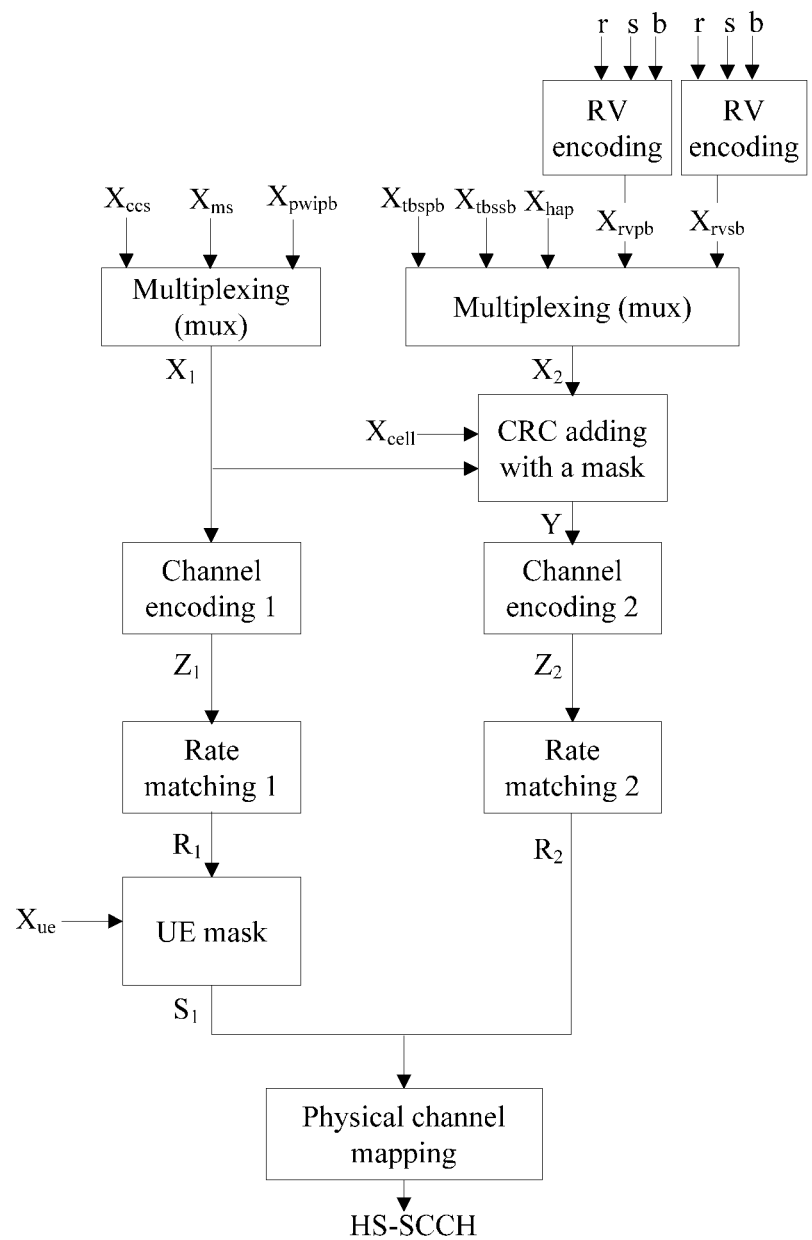

Optionally, the network side device allocates the UE a group of N CIDs, which are Cid (1) ... Cid (N) respectively, where each CID number in the group is corresponding to one serving cell. In an encoding process, an existing UE identity (which is assigned by the network side device) is still used in part 1, and the CID is used to perform scrambling on CRC in part 2. As shown in FIG. 6, Xue in the left branch is original Xue; Xcell in the right branch is the CID. The CID may be a sequence of 16 bits (a rule may be the same as that of the UE identity) or a sequence of another length (for example, a sequence of less than 16 bits).

It should be noted that, for the foregoing encoding procedure, reference may be made to a description in an existing protocol specification; for details, refer to 3GPP TS25.212 v11.4.0 or HS-SCCH encoding-related sections in an updated version, and details are not further described herein.

403. The network side device carries at least one piece of encoded control information in a same serving cell, and sends the control information to the user equipment UE.

404. After receiving the control information, the UE performs decoding, and determines a serving cell to which data corresponding to the control information belongs.

Optionally, if in an encoding process, the network side device performs scrambling by using a new UE identity in both the left and right branches, when performing HS-SCCH detection and decoding, the UE uses all possible UE identities (which are assigned by the network side device) for an attempt separately. Once an attempt by using a UE identity succeeds (detection and decoding are successful), it may be determined that the data corresponding to the control information belongs to a serving cell corresponding to the UE identity, and data information is received, demodulated and decoded in the serving cell.

Optionally, if in an encoding process, the network side device performs scrambling on Part1 by using a unique UE identity, and performs scrambling on CRC by using a CID. When the UE performs detection, the UE still uses the UE identity for descrambling to determine whether the control information belongs to the UE itself; then after performing decoding and check (using all possible CIDs for descrambling) on Part 2, the UE acquires a serving cell to which the data corresponding to the control information belongs, and then receives data from the serving cell and processes the data.

405. The UE receives, in the serving cell, the data corresponding to the control information.

Compared with the prior art, in this embodiment of the present invention, a new control information encoding method is used, and a serving cell identity is mapped to control information, so that a UE receives the control information, determines, according to the serving cell identity in the control information, a serving cell to which data corresponding to the control information belongs, and then performs demodulation and decoding on the data. Because all control information is sent after being centralized in one serving cell, it can be implemented that fewer control channels are used to achieve a scheduling function the same as that in the prior art, a network side device may use fewer code channel numbers, and a quantity of code channels to be listened to may be reduced for the UE, thereby reducing code channel overheads for both the network side device and the UE and improving code channel utilization efficiency.

Embodiment 5

Figure 7:
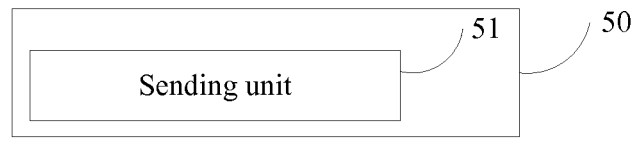
FIG. 7 and FIG. 8 are schematic structural diagrams of a base station according to Embodiment 5 of the present invention.

This embodiment provides a base station 50. As shown in FIG. 7, the base station 50 includes: a sending unit 51, configured to send at least one piece of control information carried in a first serving cell to a user equipment UE, where the control information includes a cell identity CID, so that the UE parses an information field of the control information to acquire the CID, determines, according to the CID, a serving cell to which data corresponding to the control information belongs, and performs demodulation and decoding on the data in the serving cell by using the control information.

The at least one piece of control information is the at least one piece of control information carried on a high speed shared control channel HS-SCCH of the first serving cell.

The information field of the control information includes a first part Part1 and a second part Part2, and the cell identity is set in the first part Part1 in the information field of the control information and/or the second part Part2 in the information field of the control information.

Figure 8:
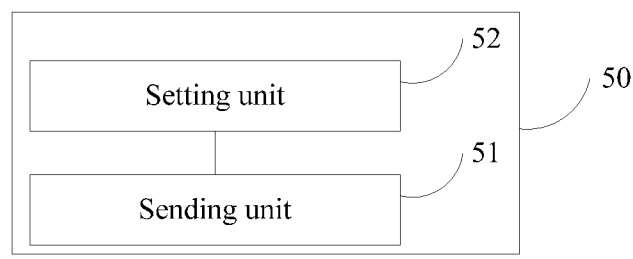

Further, as shown in FIG. 8, before the sending unit 51 sends the at least one piece of control information carried in the first serving cell to the user equipment UE, the base station 50 further includes: a setting unit 52, configured to set for the UE an HS-SCCH code channel set to which the UE needs to listen.

Further, the sending unit 51 is further configured to: send each piece of control information to the UE by using one code channel in the code channel set.

The serving cell to which the data corresponding to the control information belongs is the first serving cell or a second serving cell.

Compared with the prior art, in this embodiment of the present invention, multiple pieces of control information are sent to a UE on a control channel HS-SCCH of a same serving cell, and a cell identity is set in an information field of the control information, so that the user equipment UE listens to the control channel of the serving cell, receives the control information, determines, according to the cell identity in the control information, a serving cell to which data corresponding to the control information belongs, and then performs demodulation and decoding on the data. Because all control information is sent after being centralized in one serving cell, it can be implemented that fewer control channels are used to achieve a scheduling function the same as that in the prior art, and a network side device may use fewer code channel numbers, thereby reducing code channel overheads and improving code channel utilization efficiency.

Embodiment 6

Figure 9:
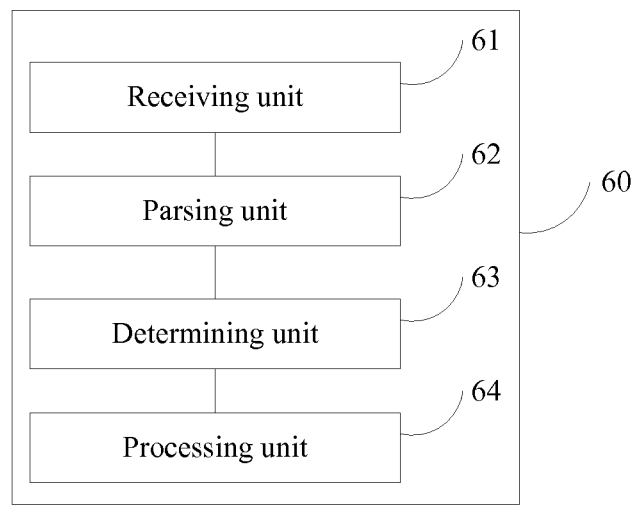
FIG. 9 is a schematic structural diagram of a user equipment according to Embodiment 6 of the present invention.

The embodiment provides a user equipment UE 60. As shown in FIG. 9, the user equipment 60 includes: a receiving unit 61, configured to receive at least one piece of control information sent by a base station in a first serving cell; a parsing unit 62, configured to parse an information field of the control information received by the receiving unit 61, to acquire a cell identity CID; a determining unit 63, configured to determine, according to the cell identity obtained by parsing by the parsing unit 62, a serving cell to which data corresponding to the control information belongs; and a processing unit 64, configured to perform, by using the control information received by the receiving unit 61, demodulation and decoding on the data in the serving cell determined by the determining unit 63.

The information field of the control information includes a first part Part1 and a second part Part2, and the cell identity is set in the first part Part1 in the information field of the control information and/or the second part Part2 in the information field of the control information. The serving cell to which the data corresponding to the control information belongs is the first serving cell or a second serving cell.

Compared with the prior art, in the embodiment of the present invention, the user equipment UE 60 listens to a control channel of the serving cell, receives multiple pieces of control information, where the control information is sent on a control channel HS-SCCH of a same serving cell in a centralized manner, determines, according to a cell identity in the control information, a serving cell to which data corresponding to the control information belongs, and then performs demodulation and decoding on the data. All control information is sent in one serving cell in a centralized manner, thereby implementing, by using fewer control channels, a scheduling function the same as that in the prior art. A quantity of code channels that need to be monitored by the UE 60 may be reduced, thereby reducing code channel overheads and improving code channel utilization efficiency.

Embodiment 7

Figure 10:
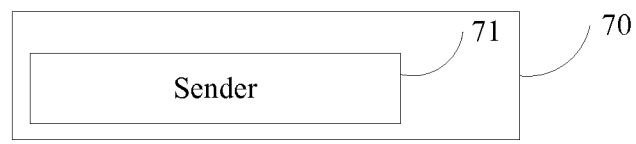
FIG. 10 and FIG. 11 are schematic structural diagrams of a base station according to Embodiment 7 of the present invention.

The embodiment provides a base station 70. As shown in FIG. 10, the base station 70 includes: a sender 71, configured to send at least one piece of control information carried in a first serving cell to a user equipment UE, where the control information includes a cell identity CID, so that the UE parses an information field of the control information to acquire the CID, determines, according to the CID, a serving cell to which data corresponding to the control information belongs, and performs demodulation and decoding on the data in the serving cell by using the control information.

The at least one piece of control information is the at least one piece of control information carried on a high speed shared control channel HS-SCCH of the first serving cell.

Optionally, the information field of the control information includes a first part Part1 and a second part Part2, and the cell identity is set in the first part Part1 in the information field of the control information and/or the second part Part2 in the information field of the control information.

Figure 11:
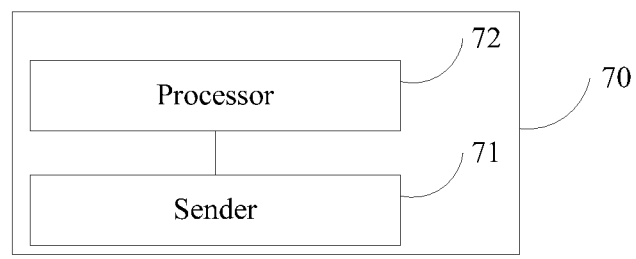

Further, as shown in FIG. 11, before the sender 71 sends the at least one piece of control information carried in the first serving cell to the user equipment UE, the base station 70 further includes: a processor 72, configured to set for the UE an HS-SCCH code channel set to which the UE needs to listen.

Further, the sender 71 is further configured to: send each piece of control information to the UE by using one code channel in the code channel set.

The serving cell to which the data corresponding to the control information belongs is the first serving cell or a second serving cell.

Because content such as information exchange between units in the apparatus, an execution process, and the like in this embodiment and the method embodiments of the present invention belong to a same conception. For specific content, reference may be made to a description in the method embodiments of the present invention, and details are not described herein again.

Compared with the prior art, in this embodiment of the present invention, multiple pieces of control information are sent to a UE on a control channel HS-SCCH of a same serving cell, and a cell identity is set in an information field of the control information, so that the user equipment UE listens to the control channel of the serving cell, receives the control information, determines, according to the cell identity in the control information, a serving cell to which data corresponding to the control information belongs, and then performs demodulation and decoding on the data. Because all control information is sent after being centralized in one serving cell, it can be implemented that fewer control channels are used to achieve a scheduling function the same as that in the prior art, and a network side device may use fewer code channel numbers, thereby reducing code channel overheads and improving code channel utilization efficiency.

Embodiment 8

Figure 12:
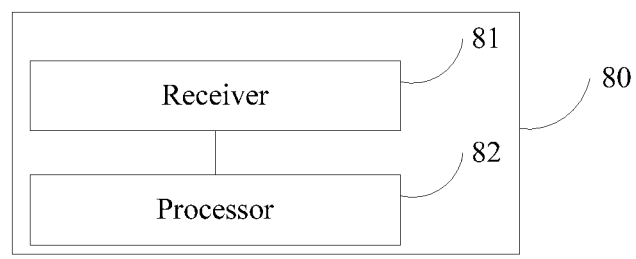
FIG. 12 is a schematic structural diagram of a user equipment according to Embodiment 8 of the present invention.

This embodiment provides a user equipment UE 80. As shown in FIG. 12, the user equipment 80 includes: a receiver 81, configured to receive at least one piece of control information sent by a base station in a first serving cell; and a processor 82, configured to parse an information field of the control information received by the receiver 81, to acquire a cell identity CID; configured to determine, according to the cell identity, a serving cell to which data corresponding to the control information belongs; and configured to perform demodulation and decoding on the data in the serving cell by using the control information.

The information field of the control information includes a first part Part1 and a second part Part2, and the cell identity is set in the first part Part1 in the information field of the control information and/or the second part Part2 in the information field of the control information. The serving cell to which the data corresponding to the control information belongs is the first serving cell or a second serving cell.

Because content such as information exchange between units in the apparatus, an execution process, and the like in this embodiment and the method embodiments of the present invention belong to a same conception. For specific content, reference may be made to a description in the method embodiments of the present invention, and details are not described herein again.

Compared with the prior art, in this embodiment of the present invention, the user equipment UE 80 listens to a control channel of the serving cell, receives multiple pieces of control information, where the control information is sent after being centralized on a control channel HS-SCCH of a same serving cell, determines, according to a cell identity in the control information, a serving cell to which data corresponding to the control information belongs, and then performs demodulation and decoding on the data. Because all control information is sent after being centralized in one serving cell, it can be implemented that fewer control channels are used to achieve a scheduling function the same as that in the prior art, and a quantity of code channels that need to be monitored by the UE 80 may be reduced, thereby reducing code channel overheads and improving code channel utilization efficiency.

It should be noted that the method for indicating control information by using a cell identity CID in the foregoing embodiment of the present invention may also be applicable to a similar scenario. For example, in a virtual multi-sector technology, a same scrambling code is configured for all sectors, which logically belong to a same real cell; however, the sectors are spatially isolated from each other. In this case, one port ID (which is corresponding to a cell identity in a real multi-carrier technology) is allocated to a data transmit port of each virtual cell. When a UE is located within ranges of multiple virtual cells, a network side device may also add a port ID (PID) on a corresponding HS-SCCH when sending data to the UE, to notify the UE of a port (which is equivalent to a virtual cell) that is currently used to send data. The port ID PID herein have an equivalent function as the CID in the foregoing embodiment, thereby improving code channel utilization efficiency in the virtual multi-sector technology. Therefore, the present invention may not only be applied to the multi-carrier technology and the virtual multi-sector technology, but also be applied to a technology similar to the two.

The control information indication apparatus provided in the embodiments of the present invention may implement the method embodiments provided in the foregoing; for specific function implementation, refer to a description in the method embodiments, and details are not described herein again. The control information indication method and apparatus provided in the embodiments of the present invention may be applicable to a multi-carrier technical scenario to indicate control information for data of a supplementary carrier, to which it is not limited herein.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include: a magnetic disk, an optical disc, a read-only memory (ROM), or a random access memory (RAM). The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A control information indication method, comprising:
   setting a carrier identity in an information field of a piece of control information, wherein the carrier identity is used for a user equipment (UE) to determine a serving cell to which data corresponding to the piece of control information belongs, wherein the information field comprises a first part and a second part, the first part is carried in a first time slot and the second part is carried in two time slots subsequent to the first time slot, and the carrier identity is partially set in the first part and partially set in the second part; and
   sending at least one piece of the control information carried in a first channel in a first serving cell to the UE, so that the UE determines, according to the carrier identity, the serving cell to which data corresponding to the at least one piece of the control information belongs, and performs demodulation and decoding on the data corresponding to the at least one piece of the control information in the serving cell using the at least one piece of the control information.

2. The method according to claim 1, wherein the first channel is a high speed shared control channel (HS-SCCH) of the first serving cell.

3. The method according to claim 1, before the sending, the method further comprises setting for the UE an HS-SCCH code channel set to which the UE needs to listen.

4. The method according to claim 3, wherein the sending comprises sending each piece of control information to the UE by using one code channel in the code channel set.

5. The method according to claim 1, wherein the serving cell to which the data corresponding to the at least one piece of the control information belongs is the first serving cell or a second serving cell.

6. A control information indication method, comprising:
   receiving at least one piece of control information sent by a base station using a first channel in a serving cell;
   parsing an information field of the at least one piece of control information to acquire a carrier identity, wherein the information field of the control information comprises a first part and a second part, the first part is carried in a first time slot and the second part is carried in two time slots subsequent to the first time slot, and the carrier identity is partially set in the first part and partially set in the second part;
   determining, according to the carrier identity, a serving cell to which data corresponding to the at least one piece of control information belongs; and
   performing demodulation and decoding on the data corresponding to the at least one piece of control information in the determined serving cell by using the at least one piece of control information.

7. The method according to claim 6, wherein the determined serving cell is a first serving cell or a second serving cell.

8. A base station, comprising:
   a processor;
   a non-transitory computer readable medium connected to the processor and having stored thereon instructions that, when executed, cause the processor to:
      setting a carrier identity in an information field of a piece of control information, wherein the carrier identity is used for a user equipment (UE) to determine a serving cell to which data corresponding to the piece of control information belongs, wherein the information field comprises a first part and a second part, the first part is carried in a first time slot and the second part is carried in two time slots subsequent to the first time slot, and the carrier identity is partially set in the first part and partially set in the second part; and
   a transmitter, configured to send at least one piece of the control information carried in a first channel of a first serving cell to the UE, so that the UE determines, according to the carrier identity, the serving cell to which data corresponding to the at least one piece of the control information belongs, and performs demodulation and decoding on the data corresponding to at least one piece of the control information in the serving cell using the control information.

9. The base station according to claim 8, wherein the first channel is a high speed shared control channel (HS-SCCH) of the first serving cell.

10. The base station according to claim 8, wherein before the transmitter sends the at least one piece of the control information carried in the first serving cell to the UE, the processor causes, for the UE, an HS-SCCH code channel set to set, to which the UE needs to listen before the transmitter sends the at least one piece of the control information.

11. The base station according to claim 10, wherein the transmitter is further configured to send each piece of control information to the UE by using one code channel in the code channel set.

12. A user equipment, comprising:
   a receiver, configured to receive at least one piece of control information sent by a base station using a first channel in a first serving cell; and
   a processor connected to a non-transitory computer readable medium having stored thereon instructions that, when executed, cause the processor to:
      parse an information field of the at least one piece of control information to acquire a carrier identity, wherein the information field of the at least one piece of control information comprises a first part and a second part, the first part is carried in a first time slot and the second part is carried in two time slots subsequent to the first time slot, and the carrier identity is partially set in the first part and partially set in the second part;

determine, according to the carrier identity, a serving cell to which data corresponding to the at least one piece of control information belongs; and perform demodulation and decoding on the data corresponding to the at least one piece of control information in the determined serving cell by using the at least one piece of control information.

13. The user equipment according to claim 12, wherein the determined serving cell is a first serving cell or a second serving cell.

* * * * *